United States Patent [19]
Ferrucci et al.

[11] Patent Number: 6,116,436
[45] Date of Patent: Sep. 12, 2000

[54] MODULAR SHELVING STORAGE SYSTEM

[75] Inventors: Robert D. Ferrucci, Nanticoke; Robert K. Swartz; Robert J. Welch, both of Dallas; Joseph R. Petcavage, White Haven, all of Pa.

[73] Assignee: Metro Industries, Inc., Reno, Nev.

[21] Appl. No.: 09/156,762

[22] Filed: Sep. 18, 1998

[51] Int. Cl.[7] .................................................. A47F 5/00
[52] U.S. Cl. .................... 211/187; 211/184; 211/181.1; 108/181
[58] Field of Search ................................ 211/187, 181.1, 211/43, 184, 90.03, 41.1; 108/61, 181

[56] References Cited

U.S. PATENT DOCUMENTS

| | | | |
|---|---|---|---|
| 2,702,127 | 2/1955 | Pastorius, III et al. | 211/41.1 |
| 3,185,307 | 5/1965 | Higgins | 211/40 |
| 3,739,918 | 6/1973 | Kreitzburg | 211/184 X |
| 4,410,093 | 10/1983 | Chianiello et al. | 211/184 X |
| 4,592,471 | 6/1986 | Bross | 108/61 X |
| 4,729,485 | 3/1988 | Kulbersh | 211/181.1 X |
| 5,074,420 | 12/1991 | Cappel | 211/181.1 X |
| 5,390,803 | 2/1995 | McAllister | 211/181.1 X |
| 5,924,577 | 7/1999 | Gessert | 211/41.1 |

*Primary Examiner*—Robert W. Gibson, Jr.
*Attorney, Agent, or Firm*—Fitzpatrick, Cella, Harper & Scinto

[57] ABSTRACT

A modular shelving system including a plurality of support posts, a plurality of shelves having respective support members for supporting each of the plurality of shelves at selective locations on the plurality of support posts, and at least one divider including first and second support beams and a plurality of partitions disposed between the first and second support beams. Each of the first and second support beams is supportable on one of the plurality of shelves at first and second ends of the support beams, and each of the plurality of partitions is supported at respective ends thereof by the first and second support beams and projecting away from the first and second support beams, thereby defining a respective plurality of slots between the plurality of partitions.

93 Claims, 9 Drawing Sheets

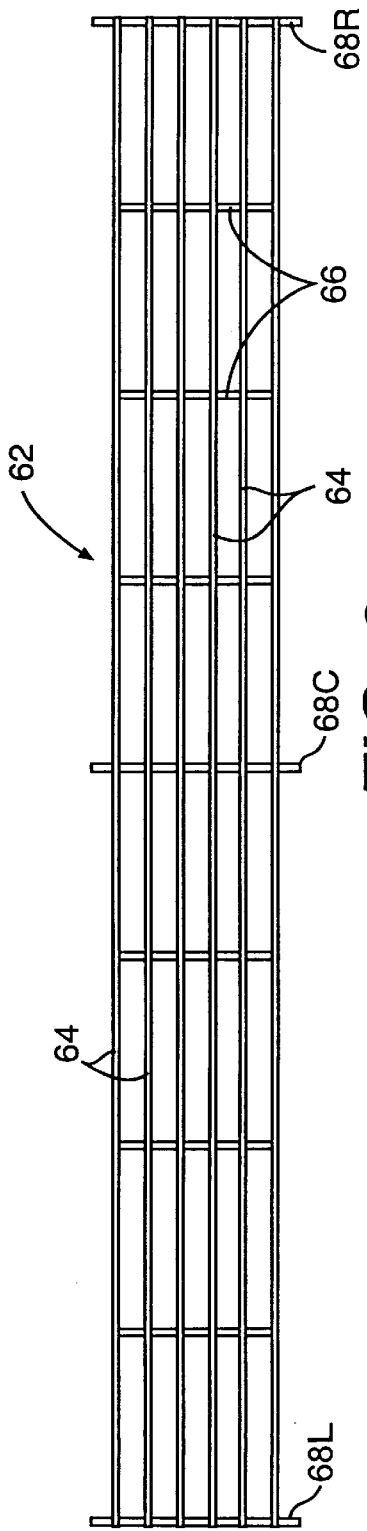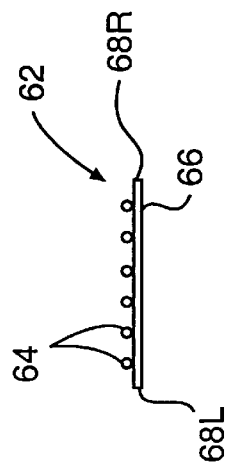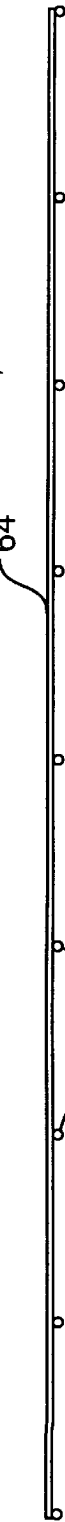

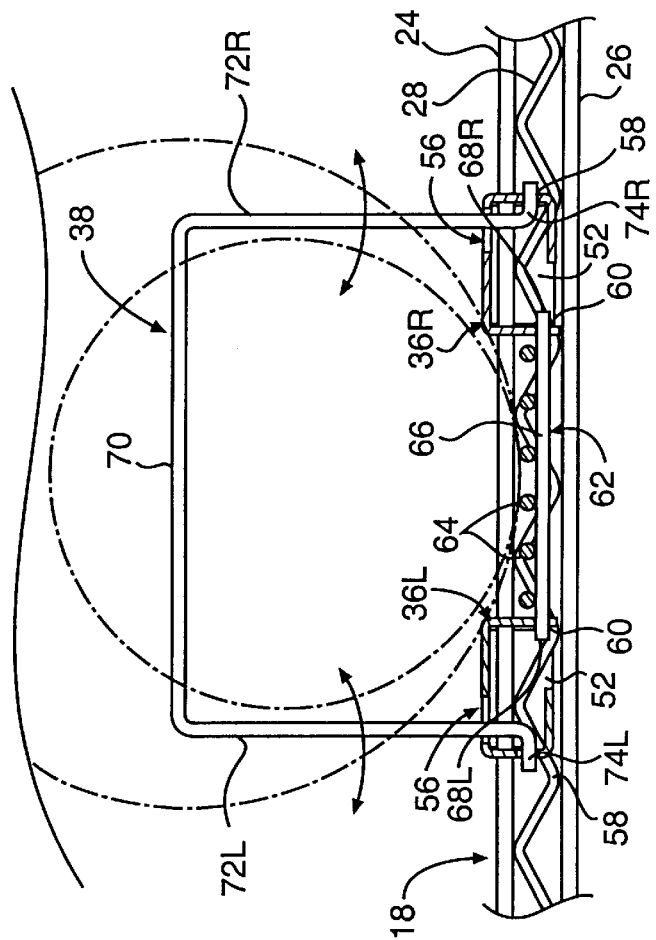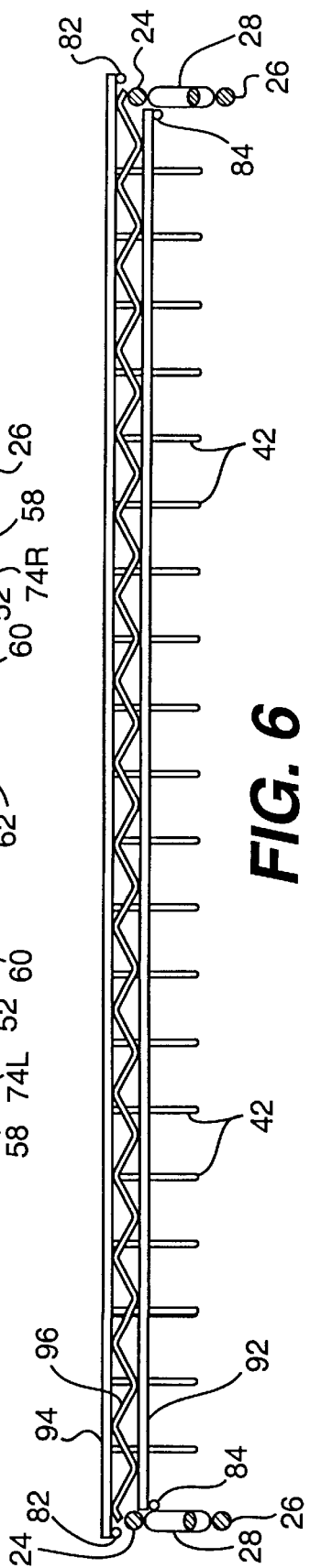

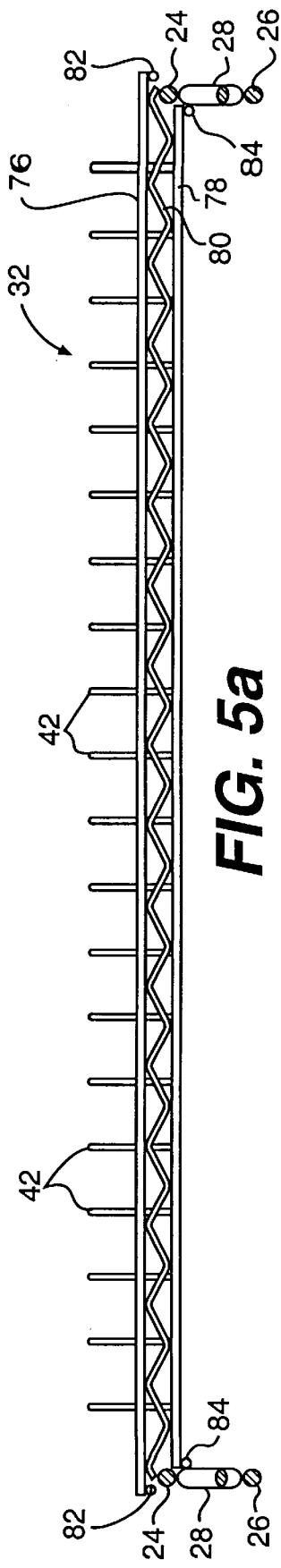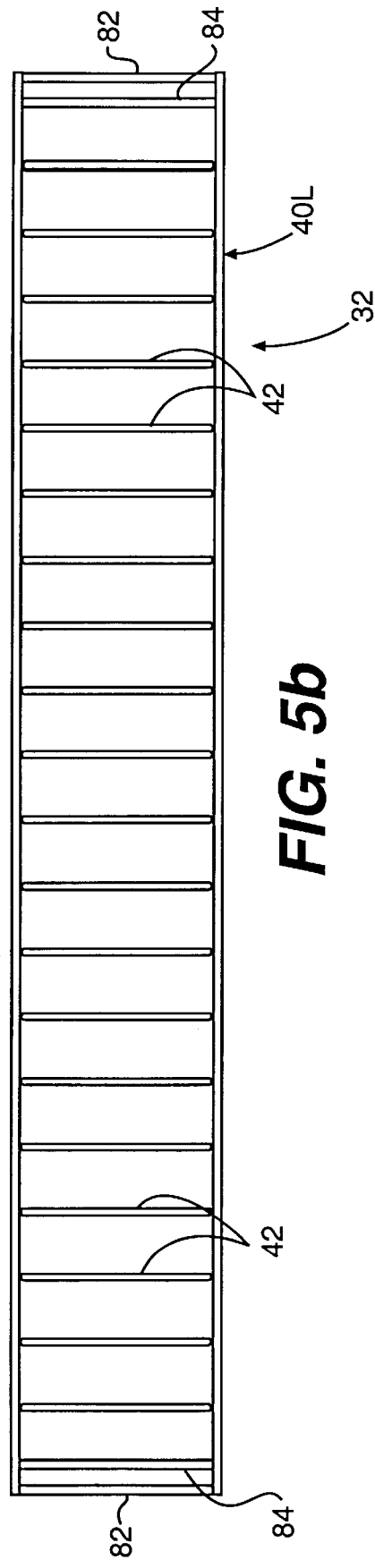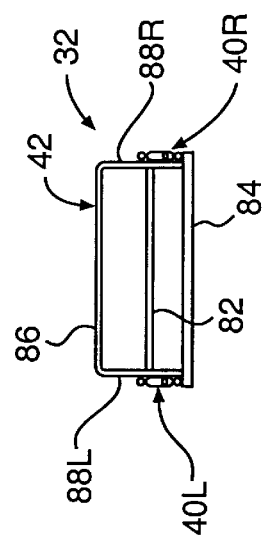

MODULAR SHELVING STORAGE SYSTEM

BACKGROUND OF THE INVENTION

1. Field of the Invention

The present invention relates generally to shelving systems, and more particularly to an improved modular shelving storage system including modular divider assemblies. The present invention has particular utility when used together with a knock-down shelving system, but may be used in other shelving systems.

2. Description of the Prior Art

Shelving systems, including knock-down shelving systems, utilizing open or ventilated shelving structures are known. Shelving systems for storing electronic component accessories also are known. However, such conventional shelving systems generally provide shelves having fixed divider or petition configurations. Electronic component accessories typically come in a variety of standard sizes and shapes. For example, stencils used to solder marks on a printed circuit board (PCB) commonly come in various standard sizes, including widths of 1, 1½ and 1¾ inches, and sizes of 24×24, 24×29 and 29×29 inches. Reels for storing electronic components commonly come in a variety of sizes including 7, 13 and 15 inch diameters, with tape diameters of 8 mm, 12 mm, 16 mm, 24 mm, 32 mm, 44 mm and 52 mm. Because conventional shelving structures for holding electronic component accessories generally have fixed storage configurations, they have a drawback in that they are not readily adaptable to a variety of electronic component accessories having different standard sizes and shapes.

SUMMARY OF THE INVENTION

Accordingly, it is an object of the present invention to provide an improved modular shelving storage system.

It is another object of the present invention to provide a modular divider assembly readily adaptable to an open or ventilated shelving storage system.

It is another object of the present invention to provide a divider assembly for an open or ventilated shelving storage system that stably supports a variety of reels of electronic component accessories.

It is another object of the present invention to provide a modular divider assembly readily adaptable for storing a variety of stencils used in electronic circuit board fabrication.

These and other objects and advantages are achieved by the modular shelving storage system of the present invention which includes a divider assembly for a shelf comprising at least one divider including first and second support beams and a plurality of partitions disposed between the first and second support beams, where the first and second support beams are supportable on the shelf at first and second ends of the support beams, and where each of the plurality of partitions is supported at respective ends thereof by the first and second support beams and projects away from the first and second support beams, thereby defining a respective plurality of slots between the plurality of partitions.

In one aspect, the modular shelving storage system includes a knock-down type shelving system including at least two shelves, where the divider assembly includes at least one divider (preferably first and second dividers) supported on a first shelf and at least one other divider (e.g., a third divider) supported on a second shelf above the first shelf. The first and second dividers may be provided in a parallel arrangement, with respective partitions arranged in-line. The third divider is supported on the second shelf such that the plurality of partitions extend downwardly toward the first and second dividers, and wherein the respective partitions are arranged in-line. In this manner, the divider assembly may be adjusted to accommodate a variety of items, such as stencils used in making electronic components, e.g., circuit boards. In particular, the first and second dividers may be adjusted closer or farther away from each other on the first shelf to accommodate stencils having a variety of depths, and the first and second shelves may be moved together or apart to accommodate stencils having a variety of heights.

In another aspect, the modular shelving storage system may include a shelf supporting at least one divider including first and second beams and a plurality of partitions supported by the first and second beams, wherein the divider further includes a mat supported by and suspended between the first and second beams, and wherein each of the plurality of partitions is variably locatable along the length of the divider.

In yet another aspect, the present invention relates to a divider comprising a first support beam including a plurality of locators, such as elongated slots, a second support beam including a respective plurality of locators/slots, and a plurality of partitions, wherein each partition includes a first end engageable with one of the first plurality of locators/slots of the first beam and a second end engageable with one of the respective plurality of locators/slots of the second beam. In this manner, the partitions may be selectively located along the length of the dividers to accommodate a variety of electronic component accessories having different sizes and shapes.

In another aspect, the divider further comprises a mat supported by and suspended between the first and second beams. In one embodiment, the first beam comprises a plurality of support holes on an interior side facing the second beam, the second beam comprises a plurality of support holes on an interior side facing the first beam, and the mat comprises a respective plurality of first and second projections supportable in the plurality of support holes of the first and second beams, whereby the mat is suspended between the first and second beams. In this aspect, the width of the partitions and mat selectively may be varied to accommodate a variety of electronic component accessories having different sizes and shapes. In an alternative embodiment, the first beam, second beam and mat may be provided in the form of a single piece, e.g., a continuous metal sheet bent or folded to form these various features. In this aspect, the width and depth of a trough formed by the mat between the first and second beams selectively may be varied to accommodate a variety of electronic component assemblies having different shapes and sizes.

In yet another aspect, the present invention relates to a divider assembly comprising a plurality of dividers, where each divider includes first and second beams and a plurality of partitions disposed therebetween, with respective ends of the partitions being supported by or fixed to the first and second beams. At least one divider includes a plurality of partitions supported on first and second beams such that when the divider is supported on a shelf (e.g., the lower shelf) the partitions extend upward away from the first and second beams; at least one divider includes a plurality of partitions supported on first and second beams such that when the divider is supported on a shelf (e.g., the upper shelf) the partitions extend downward away from the first and second beams. Each of the dividers is supportable at its respective ends at various locations on the respective shelves. In one embodiment, the dividers respectively are provided on upper and lower shelves of an adjustable or knock-down type shelving system. In this manner, the divider assembly may be adjusted to accommodate a wide variety of electronic component accessories by adjusting the relative spacing between the dividers and/or the shelves.

These and other objects, advantages and features of the present invention readily will be understood and appreciated more fully when viewed in conjunction with the following detailed description of the preferred embodiments and the accompanying drawings.

BRIEF DESCRIPTION OF THE DRAWINGS

FIG. 2a is a top plan view of a beam template, FIG. 2b is an exterior side view of the beam, FIG. 2c is a top view of the beam and FIG. 2d is an interior side view of the beam.

FIGS. 3a through 3b illustrate an embodiment of a reel storage divider mat, where FIG. 3a is a top plan view of the mat, FIG. 3b is an end view of the mat, and FIG. 3c is a side view of the mat.

FIG. 4 is a cross sectional view of a reel storage divider of FIG. 1.

FIGS. 5a through 5c illustrate a lower stencil storage divider of FIG. 1, wherein FIG. 5a is a side view of the divider, FIG. 5b is a top plan view of the divider and FIG. 5c is an end view of the divider.

FIG. 6 is a side plan view of an upper stencil storage divider of FIG. 1.

FIG. 7a is a top plan view of a divider template, FIG. 7b is a perspective view of the divider, FIG. 7c is a top plan view of the divider, FIG. 7d is a side view of the divider, FIG. 7e is a cross-sectional view of divider taken along the lines VII—VII of FIG. 7c, and FIG. 7f is an end view of the divider having an end bracket attached thereto and supported on a shelf.

DESCRIPTION OF THE PREFERRED EMBODIMENTS

Figure 1:
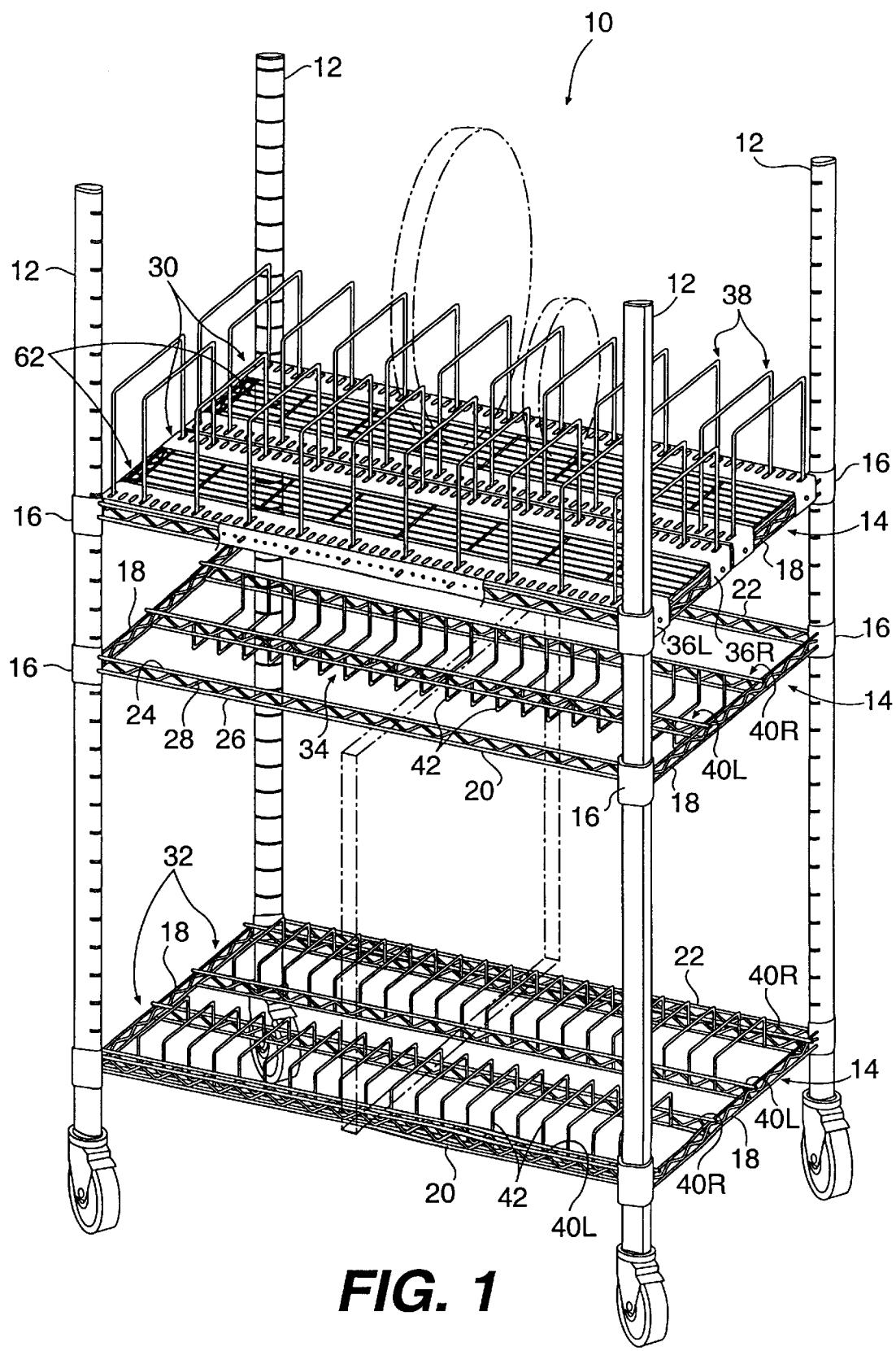
FIG. 1 illustrates a first embodiment of an open shelving storage system of the present invention including two reel storage dividers and a stencil storage divider assembly.

Referring now to the drawings, wherein like reference numbers designate like or similar structures throughout the various figures, FIGS. 1 through 6 illustrate the first embodiment of the modular shelving storage system of the present invention.

FIG. 1 illustrates a preferred embodiment of a modular shelving storage system of the present invention in the form of a knock-down shelving structure 10. Suitable knock-down type shelving systems include the Metromax® shelving system and the Super Erecta TM shelving system manufactured by Intermetro Industries, and the like, which typically include a plurality of support posts, e.g., four, arranged to support one or more shelves at corner assemblies thereof. One example of such a shelving system can be found in U.S. application Ser. No. 08/893,979, which is incorporated herein by reference.

As shown in FIG. 1, the shelving structure 10 generally includes four corner posts 12 and three shelves 14 supported on the posts 12 by adjustable corner supports 16. The shelving structure 10 optionally may be provided on casters, as shown in FIG. 1.

In the preferred embodiment, each of the shelves 14 is an open or ventilated wire perimeter shelf having right and left sides 18, a front side 20 and a rear side 22. Each side of the shelf 14 generally comprises an upper rail 24, a lower rail 26 and a central rail 28 bent back and forth in a serpentine manner between the upper rail 24 and the lower rail 26. In the preferred embodiment, each of the upper rail 24 and the lower rail 26 may be made of cold rolled steel (CRS) ¼ wire, the central serpentine rail 28 may be made of cold rolled steel (CRS) or #7 gauge stainless steel wire, and the central serpentine rail 28 may be bonded (e.g., by welding) to the upper rail 24 and lower rail 26 at bent portions thereof. However, those skilled in the art readily will appreciate alternative materials and structures for forming the shelves that may be used in other embodiments and applications.

The modular storage system of the present invention may include a plurality of divider structures. For example, in the embodiment of FIG. 1, the storage system includes three shelves, two reel storage dividers 30, two lower stencil storage dividers 32 and an upper stencil storage divider 34. Each reel storage divider 30 comprises right and left reel storage divider beams 36R, 36L and a plurality of reel storage partitions 38. Each stencil storage divider 32, 34 comprises right and left stencil storage divider beams 40R, 40L and a plurality of stencil storage partitions 42.

As discussed in greater detail below, each reel storage divider 30 is supported at its respective ends on the right and left sides 18 of the open perimeter shelf 14. Of course, the number and location of the reel storage dividers 30 may be varied based on the size of the reel dividers 30 and the shelf 14. In this manner, a variety of electronic component accessories, such as electronic component storage reels (shown in phantom in FIG. 1), may be accommodated by the modular storage system.

In the embodiment shown in FIG. 1, the modular storage system also includes three stencil storage dividers arranged on adjacent shelves. Each of the lower stencil storage dividers 32 is adjustable by selectively locating the divider on the right and left sides of the shelf 14. Similarly, the upper stencil storage divider 34 may be selectively located anywhere along the right and left sides 18 of the upper shelf 14. The upper and lower shelves selectively may be raised and lowered. In this manner, it will be appreciated that a variety of electronic component accessories, such as stencils (shown in phantom in FIG. 1) may be accommodated in the modular shelving system.

FIGS. 2a through 2d illustrate a first embodiment of a reel storage divider beam of the present invention. In this regard, FIGS. 2a through 2d illustrate a left side reel storage divider beam 36L. As illustrated in FIG. 1, each reel storage divider 30 comprises a right side reel storage divider beam 36R and a left side reel storage divider beam 36L that are mirror image structures.

Figure 2A:
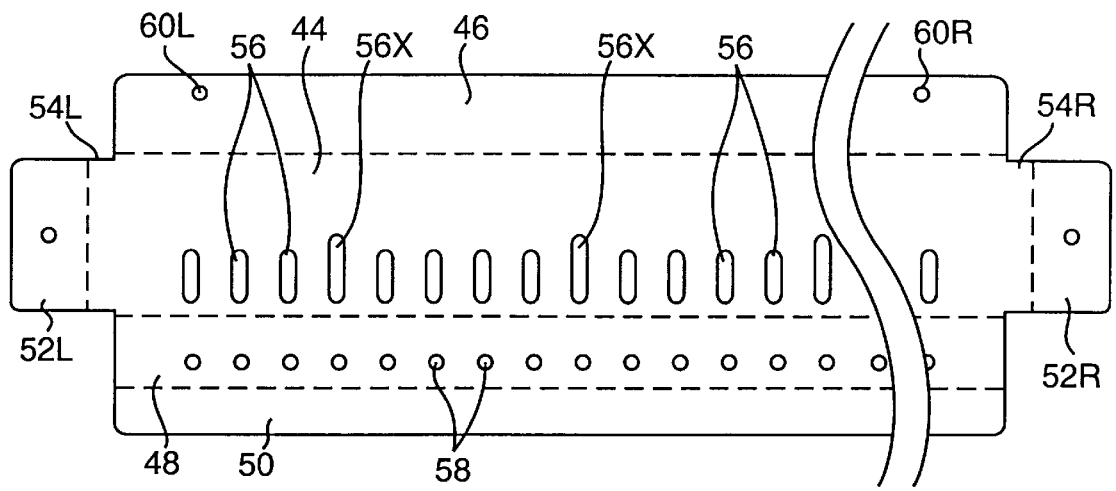
FIGS. 2a through 2d illustrate an embodiment of a beam of a reel storage divider of FIG. 1, where

FIG. 2a is a top plan view of a reel storage divider beam template 36L prior to folding; fold lines are shown as dashed lines. As shown therein, the reel storage divider beam 36L generally includes a top surface 44, an interior side 46, an exterior side 48 having an exterior side flange 50, and right and left end tabs 52R, 52L. When assembled, the various sides, flange and tabs are bent at approximately 90° angles to form a beam having a generally rectangular cross-section (see, e.g. FIG. 4).

Figure 2B:
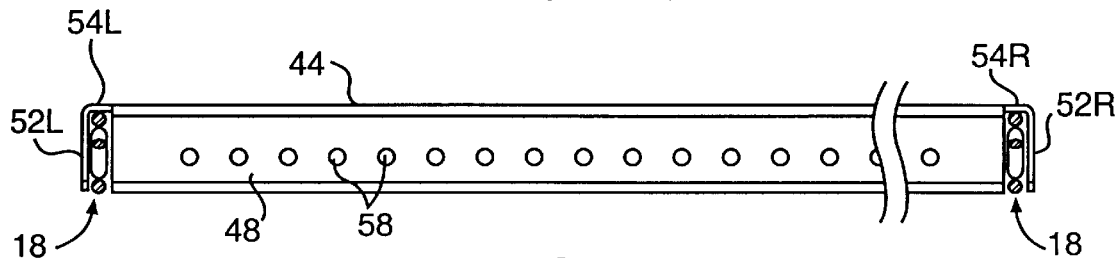
Figure 2C:
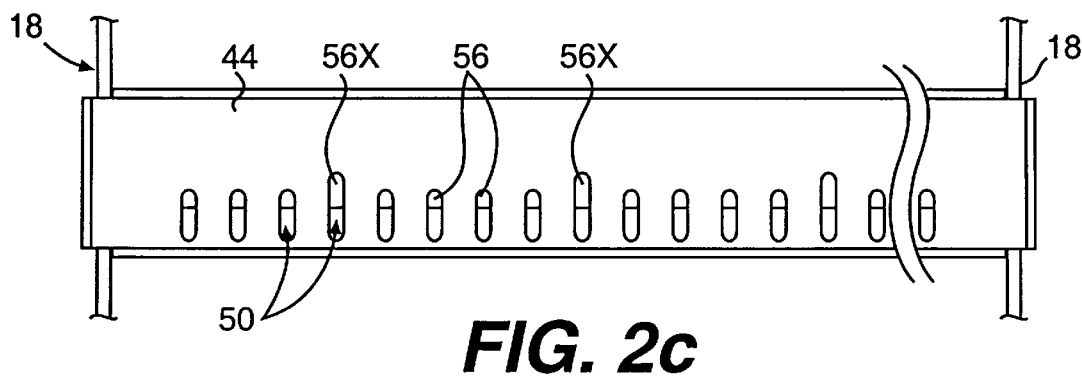
Figure 2D:
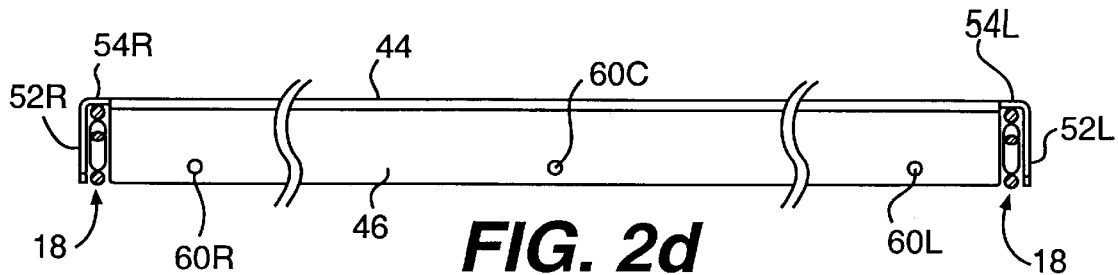

The right and left reel beam end tabs 52 (R,L) are provided with respective end tab offsets 54R, 54L for receiving respective right and left sides 18 of a shelf 14, thereby to support the reel storage divider beam 36L on the shelf 14 (see FIGS. 2b to 2d). Once located at the desired position on the shelf 14, the tabs 52R, 52L of reel storage beams 36R, 36L optionally may be secured to the shelf 14 by convention means, such as conventional hardware (including plates, screws and bolts), nylon wire ties, cable clamps, plastic or metal clips, and the like. Alternatively, the tabs 52R, 52L may be permanently secured to shelf 14, e.g., by bonding or welding. Those skilled in the art readily will appreciate numerous alternative and equivalent means for securing the beams 36R, 36L to the shelf 14.

The top surface 44 of the reel storage divider beam 36 includes a plurality of elongated holes or slots 56. In a preferred embodiment, slots 56 are arranged periodically at regular intervals along the length of the reel storage divider beam 36 (e.g., at 1 inch intervals), and a plurality of extended slots 56x selectively are also provided at regular intervals; the extended slots 56x most preferably are provided every fifth slot to facilitate easy visual indexing and alignment of corresponding slots in respective right and left reel storage divider beams 36 (R,L). Of course, other indicia or structures may be used to provide visual indexing. As discussed in greater detail below, these slots 56 function as locators for a plurality of reel storage partitions 38.

Each exterior side 48 includes a plurality of respective locking holes 58 corresponding to slots 56, 56x.

Each reel beam interior side 46 comprises a plurality of supporting holes 60 (R,C,L) for supporting a reel storage mat 62 suspended between corresponding right and left reel storage divider beams 36R, 36L. In a preferred embodiment, each reel storage divider beam 36 includes 3 reel storage mat supporting holes 60, i.e., right, center and left supporting holes 60 (R,C,L). However, the number of supporting holes and supports may be varied in accordance with the desired environment or application.

As discussed in greater detail below, the size and shape of the slots 56, 56x, locking holes 58 and mat supporting holes 60 are selected to accommodate mating parts of the divider 30. In one embodiment, the slots 56 are 0.750 inch×0.219 inch, the extended slots 56x are 1 inch×0.219 inch, the locking holes 58 are 0.219 inch dia., and the mat supporting holes 60 are 0.250 inch dia. Those skilled in the art readily will be able to select the appropriate sizes and shapes for the desired applications.

FIGS. 3a through 3c illustrate a reel storage mat 62 of the present invention. As shown therein, the reel storage mat 62 includes a plurality of rails 64 arranged in parallel and extending along the length of the mat 62, a plurality of cross-bars 66 and a plurality of reel storage mat support projections 68. The number of rails 64, cross-bars 66 and support projections 68 will vary depending on the desired width and length of mat 62, as well as the desired environment. A greater density of rails 64 may be used to prevent smaller objects from falling down between the beams 36. In the preferred embodiment, the reel storage mat includes three support projections, i.e., right, center and left support projections 68 (R,C,L). The reel storage mat support projections 68 (R,C,L) have a spacing which corresponds with the spacing of holes 60 (R,C,L) of corresponding right and left reel storage divider beams 36 (R,L).

FIG. 4 illustrates in cross section a reel storage divider 38 including right and left divider beams 36R, 36L, a partition 38 and a mat 62. As shown therein, each of right and left beams 36 (R,L) is supported at an end thereof on a side 18 of a shelf 14. More specifically, end tabs 52 of right and left reel storage divider beams 36 (R,L,) are bent downwardly from the top surface 44 of right and left beams 36 (R,L) to accommodate the side 18 of the shelf 14 in respective end tab offsets 54 (see also FIGS. 2b to 2d). A mat 62 is supported between right and left beams 36 (R,L), and suspended therebetween, by inserting respective support projections 68 through corresponding supporting holes 60. In this manner, mat 62 forms a trough between beams 36R, 36L for securely locating and supporting various accessories, such as reels containing electronic components (shown in phantom in FIG. 4).

In the present embodiment, each reel storage partition 38 is a generally U-shaped wire hoop including an arm 70, right and left legs 72R, 72L, and corresponding right and left feet 74R, 74L. To assemble divider 30, right and left legs 72 (R,L) are pinched inwardly, as shown by the arrows in FIG. 4, inserted through respective slots 56, and then released such that right and left feet 74 (R,L) are inserted through respective locking holes 58 in right and left reel storage divider beams 36 (R,L). (See also FIG. 1, wherein front side 20 of shelf 14 is partially cut-away). In this manner, each reel storage partition 38 is located and locked relative to right and left reel storage beams 36 (R,L) so as to support partition 38 in an upright position with the right and left legs 72 (R,L) and reel storage arm 70 extending away from right and left reel storage divider beams 36 (R,L). Similarly, each partition 38 may be removed by reversing this process, and relocated at another position.

The size, shape and structure of partition 38 may be selected based on the application. The width of partition 38 is selected to correspond to the width of mat 62 and beams 36R, 36L. By varying the width of mat 62 and partition 38, the width of the trough formed between the beams 36 may be selected for the desired application. Although the partition in the preferred embodiment is a wire hoop, alternative partition structures that accomplish the same functions readily will be apparent to those skilled in the art.

FIGS. 5a through 5c illustrate a preferred embodiment of a lower stencil storage divider 32 of the present invention. The lower stencil storage divider 32 generally includes right and left beams 40R, 40L and a plurality of stencil storage partitions 42.

Each beam 40 has an open or ventilated structure, including an upper rail 76, a lower rail 78 and a center rail 80 which is bent back and forth in a serpentine manner between the upper rail 76 and the lower rail 78. The center rail 80 is bonded to the upper rail 76 and the lower rail 78 at bent portions thereof. Right and left beams 40 (R,L) also are connected at respective ends by upper end cross-beams 82 and lower end cross-beams 84. As shown in FIG. 5a, the upper rail 76 extends further than the lower rail 78 at each end of the beam 40, such that beam 40 may be supported on a side 18 of shaft 14. As with the reel storage dividers, once located on the shelf 14, the stencil storage divider beams 40 optionally may be secured to the shelf 14 by conventional means, including conventional hardware (plates, screws and bolts), ties, clamps, clips and the like. Alternatively, the beam 40 may be permanently secured to the shelf 14, e.g., by bonding or welding one or more of the upper rail 76, the lower rail 78, the central rail 80, upper cross beam 62 or lower cross beam 84 to the shelf 14.

Each stencil storage partition 42 includes an arm 86 extending between the right and left beams 40 (R,L), and right and left legs 88 (R,L) which are supported by respective right and left beams 40 (R,L). In the preferred embodiment, right and left legs 88 (R,L) are fixed to respective right and left beams 40 (R,L) by conventional means, preferably by bonding, and most preferably by welding. In this manner, each stencil storage partition 42 is supported and extends upwardly in a generally vertical direction away from right and left stencil storage divider beams 40 (R,L).

In the embodiment of FIGS. 5a and 5b, partitions 42 are arranged at periodic intervals along the length of dividers 32. However, the location of the partitions may be selected to accommodate various accessories having different widths in accordance with the desired application.

FIG. 6 illustrates a preferred embodiment of an upper stencil storage divider 34. Referring to FIGS. 1 and 6, the structure of upper stencil storage divider 34 is substantially similar to the structure of lower stencil storage divider 32 (FIGS. 5a to 5c); upper stencil storage divider 34 includes right and left beams 40 (R,L), each including an upper rail 90, a lower rail 92, and a center rail 94 bent back and forth in a serpentine manner between upper rail 90 and lower rail 92. However, as shown in FIGS. 1 and 6, in upper stencil storage divider 34, right and left legs 88 of the plurality of stencil storage partitions 42 are supported by (e.g., bonded to) right and left beams 40 (R,L) such that each partition 42 extends downwardly in a generally vertical direction away from right and left beams 40 (R,L).

FIGS. 7a to 7f and FIG. 8 illustrate an alternative embodiment of the reel storage divider of the present invention. In this embodiment, the first and second beams and the mat are provided in the form a single element.

Figure 7A:
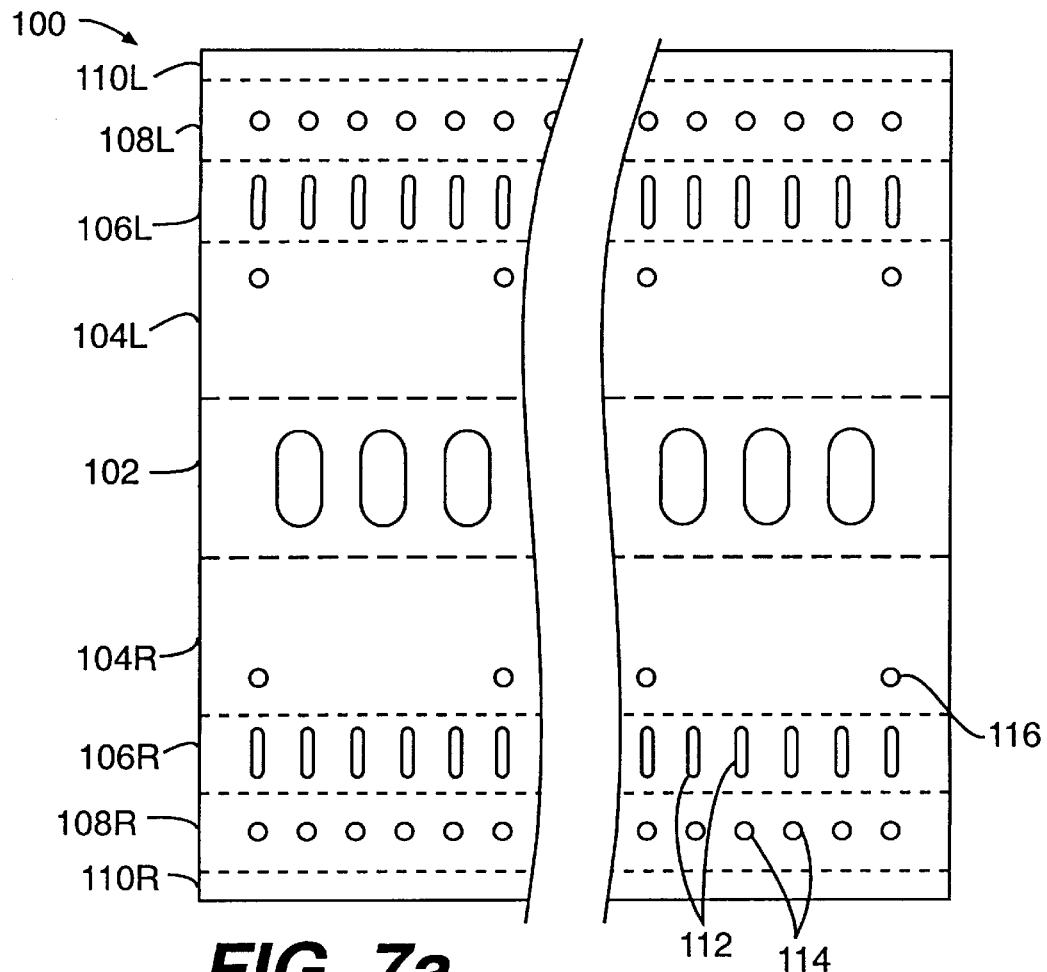
FIGS. 7a through 7f illustrate a second embodiment of the reel storage divider of the present invention, where
Figure 7C:
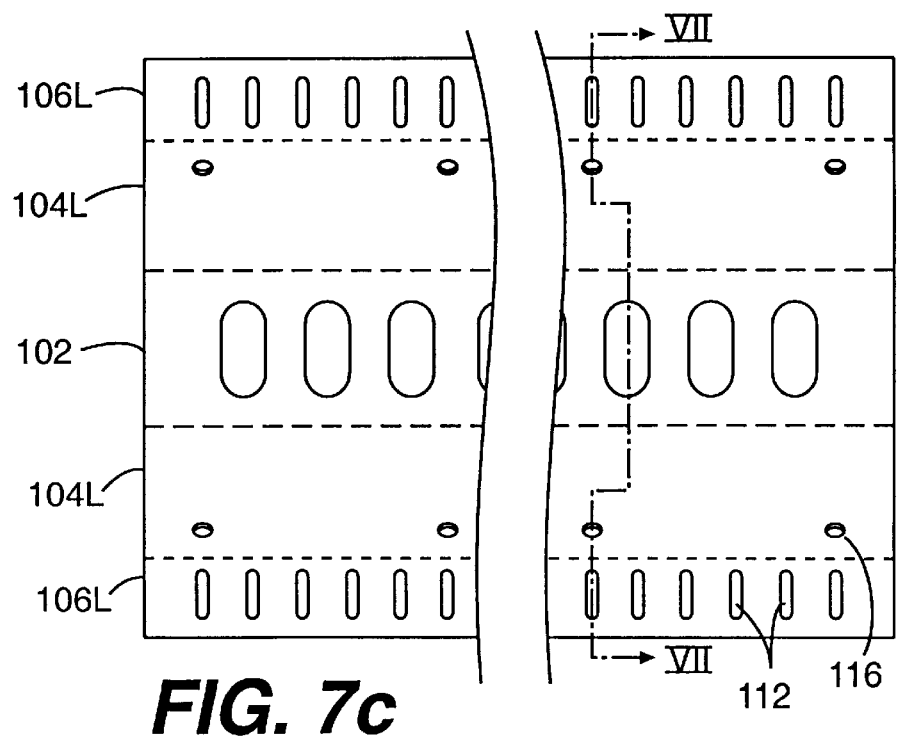

FIG. 7a is a top plan view of a one-piece template 100 for the alternative embodiment of the base of a reel divider prior to folding; fold lines are shown as dashed lines. As shown therein, the template 100 includes at its center a ventilated webbed portion (mat) 102, right and left interior side beam portions 104R, 104L, right and left top beam surfaces 106R, 106L, right and left exterior side beam portions 108R, 108L, and right and left terminal flange portions 110R, 110L.

Figure 7B:
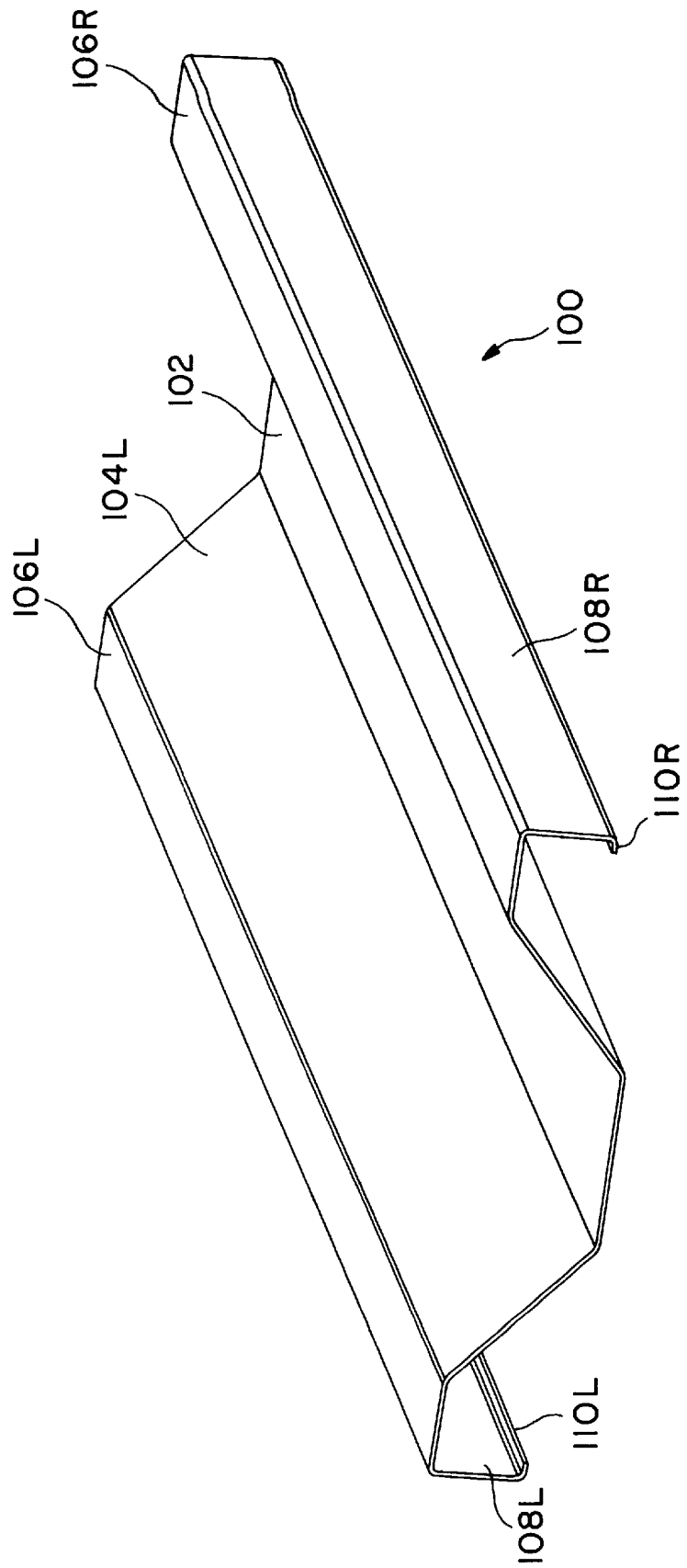
Figure 7D:
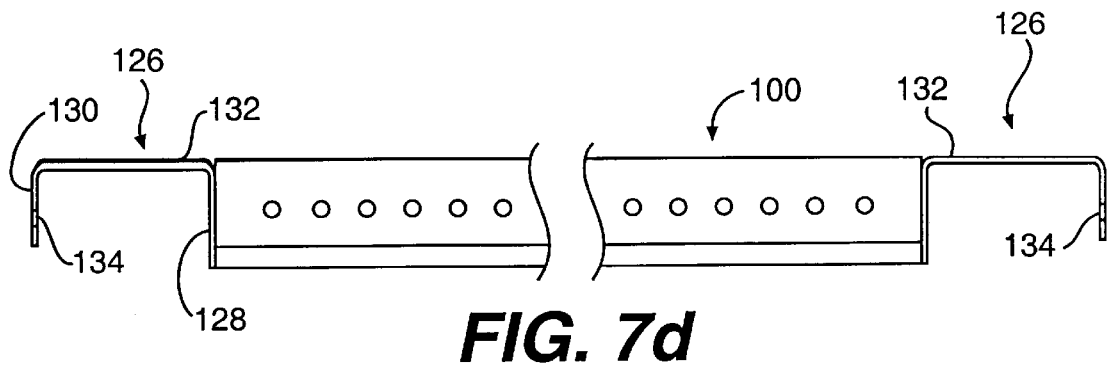

FIG. 7b schematically illustrate the reel divider beam template after folding. It will be appreciated that the present embodiment thus provides in a single piece right and left beams each comprising an interior side (104R, 104L), a top beam surface (106R, 106L), and exterior side (108R, 108L), and a terminal flange (110R, 110L). The right and left beams are connected by the ventilated webbed mat 102. As illustrated in FIGS. 7a, b, c and e, the right and left side beams are formed as mirror image structures.

As in the first embodiment, each top side 106 (R,L) includes a plurality of slots 112 formed along the length of the beam, and such slots 112 preferably are formed at regular intervals. Likewise, each exterior side 108 (R,L) of the right and left beams includes a corresponding plurality of locking holes 114. Each interior side 104 (R,L) of the right and left beams optionally includes a plurality of visual indices 116 provided at regular intervals along the length of the beam. In the embodiment of FIG. 7a, the visual indices are defined by small holes formed in the interior sides 104 (R,L) of the beams at regular intervals corresponding to every five slots 112. However, such visual indices may be provided by any suitable indicia, such as embosses, dimples, stickers, and the like, and may be arranged at different intervals as appropriate for the desired application. Those skilled in the art readily will appreciate alternative visual indicia and spacing suitable for the desired embodiment or application.

The ventilated webbed mat 102 together with right and left interior sides 104 (R,L) form a trough. As in the prior embodiment, the width of the trough formed by the ventilated webbed mat 102 and the right and left interior sides 104 (R,L) may be varied to suit the appropriate environment or application. For example, the depth and width of the trough may be varied to accommodate a specific size of electronic components, e.g., reels containing a plurality of electronic devices. More specifically, the width of the ventilated webbed mat 102, the width of the right and left interior sides 104 (R,L) and/or the angle formed between the ventilated webbed mat 102 and the respective right and left interior sides 104 (R,L) may be varied. In a preferred embodiment, the angle formed between the ventilated webbed mat 102 and the respective right and left interior sides 104 (R,L) is 41.6 degrees (see FIG. 7e). Of course, those skilled in the art readily will be able to select the respective widths and angles based on the desired environment or application.

Figure 7E:
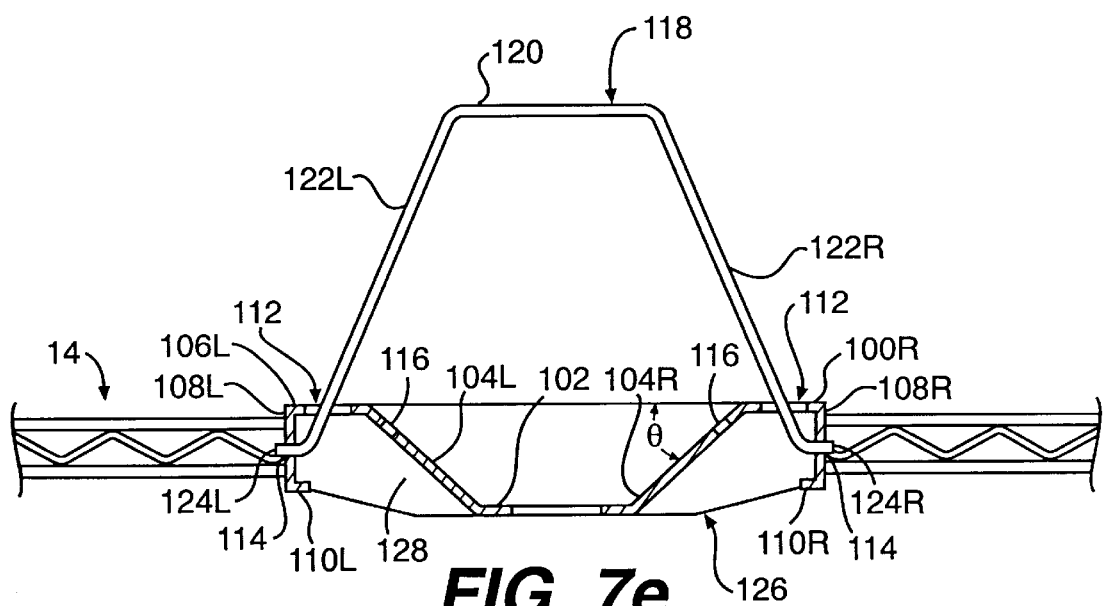

As in the first embodiment, the reel storage divider 100 of the present embodiment includes a plurality of partitions 118 supported by the respective right and left beams of the reel storage divider 100. As best shown in FIG. 7e, in one embodiment each partition 118 is formed by a wire hoop including an arm 120, right and left legs 122R, 122L, and right and left feet 124R, 124L. As in the prior embodiment, each partition 118 is supported in the right and left beams of divider 100 by pinching the right and left legs 122 (R,L) together, inserting the right and left feet 124 (R,L) through respective slots 112 in the right and left beams, and then releasing the legs 122 (R,L) such that the right and left feet 144 (R,L) are inserted through corresponding locking holes 114. In this manner, it will be appreciated that each partition 118 is supported by the right and left beams by locating and locking the partition legs 122 and feet 124 in the respective slots 112 and locking holes 114. Moreover, as discussed above, each partition may readily be removed by reversing this procedure, and relocated at a different desired location.

In the present embodiment, the one-piece reel storage divider 100 is mounted on a shelf 14 using a pair of end brackets 126. FIG. 8 illustrates one embodiment of an end bracket 126 which includes an end plate 128, a tab 130 and an offset 132. Each end bracket may be fixed, e.g., by welding or the like, to respective ends of the one-piece reel storage divider 100 (see FIGS. 7e and 7f). Each reel storage divider then may be supported on the sides 18 of an open (ventilated) shelf 14 in the same manner as in the first embodiment.

Figure 7F:
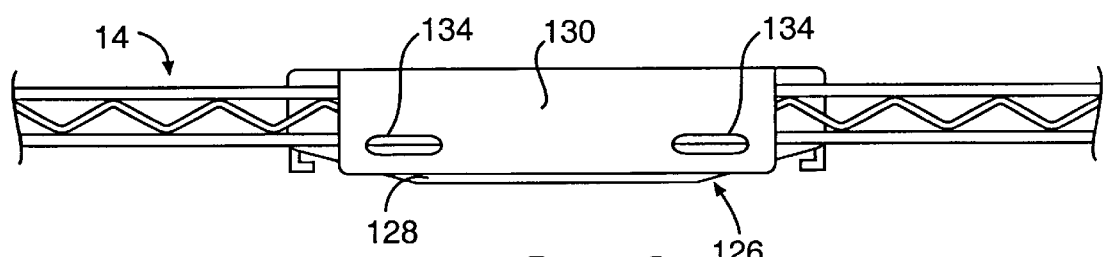
Figure 8:
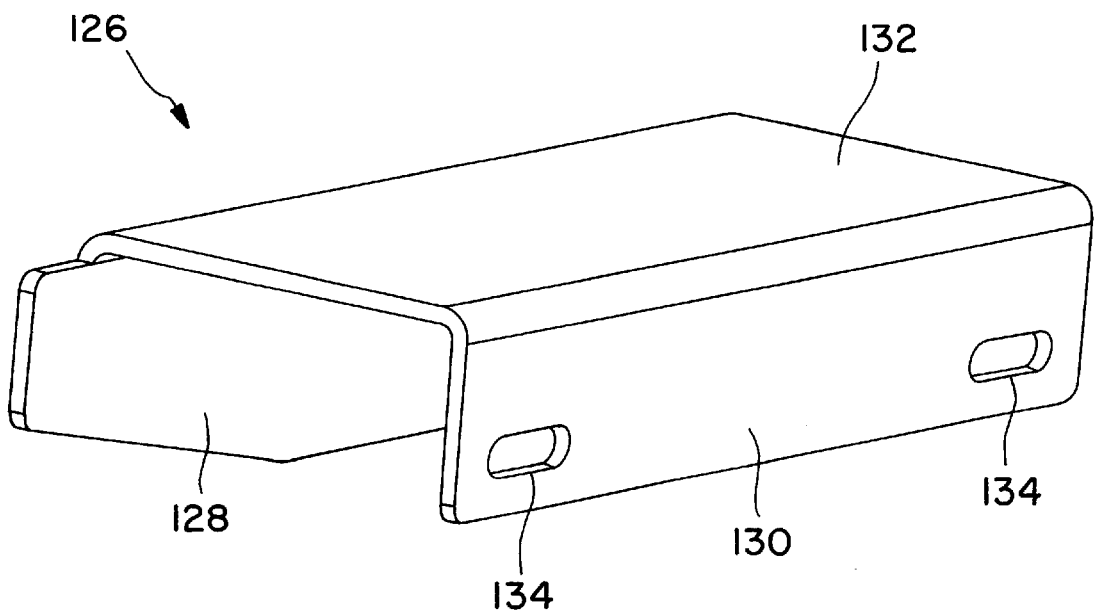
FIG. 8 is a perspective view of the end bracket of FIG. 7f.

As shown in FIGS. 7e and 7f, the depth of the trough formed by the ventilated webbed mat 102 and the right and left interior sides 104 (R,L) of the trough may extend below the right and left exterior sides 108 (R,L) and terminal flanges 110 (R,L). It will be appreciated that this configuration provides additional strength and rigidity to the divider structure.

Each reel storage divider optionally may be secured to the sides 18 of a shelf 14 by conventional means, including conventional hardware (screws, bolts and plates), nylon wire ties, cable clamps, clips and the like. The reel storage divider tabs 36, 130 may be provided, e.g., with holes or slots 134 for this purpose. Each reel storage divider alternatively may be permanently fixed to the sides 18 of a shelf 14 by bonding, e.g., by welding.

As shown in FIG. 1, in a preferred embodiment the stencil storage divider system of the present invention includes two lower stencil dividers 32 and a single upper stencil storage divider 34, although that arrangement may be varied (i.e., by using any combination of one or more lower dividers and one or more upper dividers) without departing from the scope of the invention. Respective stencil storage partitions 42 of the lower stencil storage dividers 32 and upper stencil storage divider 34 are arranged in-line, such that a stencil may be inserted through generally vertical slots defined therebetween (see stencil shown in phantom in FIG. 1). In the knock-down shelving system of the preferred embodiment, it will be appreciated that the height of the respective shelves and the regular spacing intervals of the stencil storage partitions 42 readily may be varied to accommodate stencils having numerous sizes and thicknesses.

In the preferred embodiment, each of the shelves 14, stencil storage divider beams 40 and stencil storage partitions 42 is made of metal, e.g., stainless steel, using an open wire (ventilated) shelving design. It will be appreciated that such structures are strong, stable, durable, easily assembled and easily cleaned. However, those skilled in the art readily will appreciate that other materials, e.g., molded plastics, may provide particularly utility and advantages in different environments and applications.

Similarly, in the preferred embodiments the reel storage divider beams 36, 100 preferably are formed by stamping and machining/bending sheet metal, preferably stainless steel sheet metal. Thus, the reel storage divider beams 36, 100 of the preferred embodiments also are strong, stable, easily and cheaply manufactured, and easy to clean. However, those skilled in the art readily will be able to identify alternative compositions and structures suitable for various alternative embodiments and environments.

Although specific embodiments of the present invention have been described above in detail, it will be understood that this description is merely for purposes of illustration. Various modifications of and equivalent structures corresponding to the preferred embodiments in addition to those described above may be made by those skilled in the art without departing from the spirit of the present invention which is defined in the following claims, the scope of which is to be accorded the broadest interpretation so as to encompass such modifications and equivalent structures.

What is claimed is:

1. A modular shelving system comprising:
    a plurality of support posts;
    a plurality of shelves, including respective support members that selectively support the plurality of shelves at various locations on said plurality of support posts; and
    at least one divider including first and second support beams and a plurality of partitions disposed between said first and second support beams, each of said first and second support beams being supportable on one of said plurality of shelves by first and second ends of the support beams, each of said plurality of partitions being supported at respective ends thereof by said first and second support beams and projecting away from said first and second support beams, thereby defining a respective plurality of slots between said plurality of partitions.

2. A modular shelving system according to claim 1, wherein when said at least one divider is supported on a shelf, each of said plurality of partitions projects downwardly from said first and second support beams.

3. A modular shelving system according to claim 1, wherein when said at least one divider is supported on a shelf, each of said plurality of partitions projects upwardly from said first and second support beams.

4. A modular shelving system according to claim 1, comprising at least one divider supportable on a lower shelf and at least one divider supportable on an upper shelf, wherein each of said plurality of partitions projects into an interior region between the lower shelf and the upper shelf.

5. A modular shelving system according to claim 4, wherein said at least one divider supportable on the lower shelf and said at least one divider supportable on the upper shelf are substantially parallel, and respective partitions of said dividers are arranged in-line with each other.

6. A modular shelving system according to claim 5, comprising a single divider supportable on the upper shelf and two dividers supportable on the lower shelf.

7. A modular shelving system according to claim 1, wherein said partitions and respective plurality of slots are parallel.

8. A modular shelving system according to claim 1, wherein each support beam has an open wire structure.

9. A modular shelving system according to claim 8, wherein each support beam comprises an upper wire, a lower wire and a central wire that is bent in a serpentine manner between said upper wire and said lower wire, said central wire being fixed to said upper wire and lower wire at bent portions of the central wire.

10. A modular shelving system according to claim 9, wherein said upper wire and said lower wire are substantially parallel to each other.

11. A modular shelving system according to claim 9, wherein each partition comprises a generally U-shaped wire hoop fixed at one end to at least one of the upper wire, the central wire and the lower wire of one of said first and second support beams and fixed at the other end to at least one of the upper wire, the central wire and the lower wire of the other one of said first and second support beams.

12. A modular shelving system according to claim 1, further comprising a mat supported by and suspended between said first beam and said second beam.

13. A modular shelving system according to claim 12, wherein said first beam and said second beam comprise respective first and second supports and said mat comprises corresponding first and second projections respectively engageable with said first and second supports.

14. A modular shelving system according to claim 13, wherein said first and second supports respectively are defined by a plurality of holes formed in the first beam and a plurality of holes formed in the second beam.

15. A modular shelving system according to claim 12, wherein said mat is an open wire mat.

16. A modular shelving system according to claim 14, wherein said mat is an open wire mat.

17. A modular shelving system according to claim 1, wherein each of said first beam and said second beam is made of a metal sheet, wherein said first beam comprises a first plurality of locators including a first plurality of slots formed in said first beam, and wherein said second beam comprises a second plurality of locators including a second plurality of slots formed in said second beam.

18. A modular shelving system according to claim 17, wherein each of said plurality of partitions is a wire hoop.

19. A modular shelving system according to claim 17, wherein said first plurality of locators are arranged in spaced relation along a length of said first beam, and said second plurality of locators are arranged at corresponding locations along a length of said second beam.

20. A modular shelving system according to claim 19, wherein said first plurality of locators are spaced at regular intervals.

21. A modular shelving system according to claim 20, wherein said first plurality of locators includes at least one indexed locator.

22. A modular shelving system according to claim 21, comprising plural indexed locators.

23. A modular shelving system according to claim 22, wherein said plural indexed locators are spaced at regular intervals along the length of said first beam.

24. A modular shelving system according to claim 21, wherein said second plurality of locators includes at least one corresponding indexed locator.

25. A modular shelving system according to claim 23, wherein said second plurality of locators includes corresponding plural indexed locators.

26. A modular shelving system according to claim 12, wherein each of said first beam and said second beam has a top surface and a bottom surface and said mat is suspended at a location below said top surface, thereby forming a trough with said first beam and said second beam.

27. A divider assembly for a shelf, comprising:
at least one divider including first and second support beams and a plurality of partitions disposed between said first and second support beams, each of said first and second support beams being supportable on the shelf by first and second ends of the support beams, each of said plurality of partitions being supported at respective ends thereof by said first and second support beams and projecting away from said first and second support beams, thereby defining a respective plurality of slots between said plurality of partitions.

28. A divider assembly according to claim 27, wherein when said at least one divider is supported on a shelf, each of said plurality of partitions projects downwardly from said first and second support beams.

29. A divider assembly according to claim 27, wherein when said at least one divider is supported on a shelf, each of said plurality of partitions projects upwardly from said first and second support beams.

30. A divider assembly according to claim 27, comprising at least one divider supportable on a lower shelf and at least one divider supportable on an upper shelf, wherein each of said plurality of partitions projects into an interior region between the lower shelf and the upper shelf.

31. A divider assembly according to claim 30, wherein said at least one divider supportable on the lower shelf and said at least one divider supportable on the upper shelf are substantially parallel, and respective partitions of said dividers are arranged in-line with each other.

32. A divider assembly according to claim 31, comprising a single divider supportable on the upper shelf and two dividers supportable on the lower shelf.

33. A divider assembly according to claim 27, wherein said partitions and respective plurality of slots are parallel.

34. A divider assembly according to claim 27, wherein each support beam has an open wire structure.

35. A divider assembly according to claim 34, wherein each support beam comprises an upper wire, a lower wire and a central wire that is bent in a serpentine manner between said upper wire and said lower wire, said central wire being fixed to said upper wire and lower wire at bent portions of the central wire.

36. A divider assembly according to claim 35, wherein said upper wire and said lower wire are substantially parallel to each other.

37. A divider assembly according to claim 35, wherein each partition comprises a generally U-shaped wire hoop fixed at one end to at least one of the upper wire, the central wire and the lower wire of one of said first and second support beams and fixed at the other one of said pair of ends to at least one of the upper wire, the central wire and the lower wire of the other support beam.

38. A divider for a shelf, comprising:
a first beam supportable on the shelf by first and second ends of the first beam, and including a first plurality of locators;
a second beam supportable on the shelf by first and second ends of the second beam, and including a respective plurality of locators; and
a plurality of partitions, each partition including a first end, engageable with one of said first plurality of locators, and a second end engageable with one of said respective plurality of locators.

39. A divider according to claim 38, further comprising a mat supported by and suspended between said first beam and said second beam.

40. A divider according to claim 39, wherein said first beam and said second beam comprise respective first and second supports and said mat comprises corresponding first and second projections respectively engageable with said first and second supports.

41. A divider according to claim 40, wherein said first and second supports respectively are defined by a plurality of holes formed in the first beam and a plurality of holes formed in the second beam.

42. A divider according to claim 39, wherein said mat is an open wire mat.

43. A divider according to claim 41, wherein said mat is an open wire mat.

44. A divider according to claim 38, wherein each of said first beam and said second beam is made of a metal sheet, and wherein said first plurality of locators comprises a first plurality of slots formed in said first beam and said second plurality of locators comprises a second plurality of slots formed in said second beam.

45. A divider according to claim 44, wherein each of said plurality of partitions comprises a wire hoop.

46. A divider according to claim 38, wherein said first plurality of locators are arranged in spaced relation along a length of said first beam, and said second plurality of locators are arranged at corresponding locations along a length of said second beam.

47. A divider according to claim 46, wherein said first plurality of locators are spaced at regular intervals.

48. A divider according to claim 47, wherein said first plurality of locators includes at least one indexed locator.

49. A divider according to claim 48, comprising plural indexed locators.

50. A divider according to claim 49, wherein said plural indexed locators are spaced at regular intervals along the length of said first beam.

51. A divider according to claim 48, wherein said second plurality of locators includes at least one corresponding indexed locator.

52. A divider according to claim 50, wherein said second plurality of locators includes corresponding plural indexed locators.

53. A divider according to claim 39 wherein each of said first beam and said second beam has a top surface and a bottom surface and said mat is suspended at a location below said top surface, thereby forming an open top trough with said first beam and said second beam.

54. A modular shelving system comprising:
a plurality of support posts;
a plurality of shelves, including respective support members that selectively support the plurality of shelves at various locations on said plurality of support posts; and
at least two dividers supportable on a lower shelf and at least one divider supportable on an upper shelf, where each divider includes first and second support beams and a plurality of partitions disposed between said first and second support beams, each of said first and second support beams being supportable on one of said plurality of shelves at first and second ends of the support beams, each of said plurality of partitions being supported at respective ends thereof by said first and second support beams and projecting away from said first and second support beams, thereby defining a respective plurality of slots between said plurality of partitions, where at least one divider supportable on the lower shelf and said at least one divider supportable on the upper shelf are substantially parallel, wherein each of said plurality of partitions projects into an interior region between the lower shelf and the upper shelf, and wherein respective partitions of said dividers are arranged in-line with each other.

55. A modular shelving system according to claim 54, wherein said partitions and respective plurality of slots are parallel.

56. A modular shelving system comprising:

a plurality of support posts;

a plurality of shelves, including respective support members that selectively support the plurality of shelves at various locations on said plurality of support posts; and at least one divider including first and second support beams and a plurality of partitions disposed between said first and second support beams, each of said first and second support beams having an open wire structure and being supportable on one of said plurality of shelves at first and second ends of the support beams, each of said plurality of partitions being supported at respective ends thereof by said first and second support beams and projecting away from said first and second support beams, thereby defining a respective plurality of slots between said plurality of partitions.

57. A modular shelving system according to claim 56, wherein each support beam comprises an upper wire, a lower wire and a central wire that is bent in a serpentine manner between said upper wire and said lower wire, said central wire being fixed to said upper wire and lower wire at bent portions of the central wire.

58. A modular shelving system according to claim 57, wherein said upper wire and said lower wire are substantially parallel to each other.

59. A modular shelving system according to claim 57, wherein each partition comprises a generally U-shaped wire hoop fixed at one end to at least one of the upper wire, the central wire and the lower wire of one of said first and second support beams and fixed at the other end to at least one of the upper wire, the central wire and the lower wire of the other one of said first and second support beams.

60. A modular shelving system comprising:

a plurality of support posts;

a plurality of shelves, including respective support members that selectively support the plurality of shelves at various locations on said plurality of support posts;

at least one divider including first and second support beams and a plurality of partitions disposed between said first and second support beams, each of said first and second support beams being supportable on one of said plurality of shelves at first and second ends of the support beams, each of said plurality of partitions being supported at respective ends thereof by said first and second support beams and projecting away from said first and second support beams, thereby defining a respective plurality of slots between said plurality of partitions, and a mat supported by and suspended between said first beam and said second beam.

61. A modular shelving system according to claim 60, wherein said first beam and said second beam comprise respective first and second supports and said mat comprises corresponding first and second projections respectively engageable with said first and second supports.

62. A modular shelving system according to claim 61, wherein said first and second supports respectively are defined by a plurality of holes formed in the first beam and a plurality of holes formed in the second beam.

63. A modular shelving system according to claim 60, wherein said mat is an open wire mat.

64. A modular shelving system according to claim 62, wherein said mat is an open wire mat.

65. A modular shelving system comprising:

a plurality of support posts;

a plurality of shelves, including respective support members that selectively support the plurality of shelves at various locations on said plurality of support posts; and at least one divider including first and second support beams and a plurality of partitions disposed between said first and second support beams, each of said first and second support beams being supportable on one of said plurality of shelves at first and second ends of the support beams, each of said plurality of partitions being supported at respective ends thereof by said first and second support beams and projecting away from said first and second support beams, thereby defining a respective plurality of slots between said plurality of partitions, wherein each of said first beam and said second beam is made of a metal sheet, wherein said first beam comprises a first plurality of locators including a first plurality of slots formed in said first beam and said second beam comprises a second plurality of locators including a second plurality of slots formed in said second beam.

66. A modular shelving system according to claim 65, wherein each of said plurality of partitions is a wire hoop.

67. A modular shelving system according to claim 65, wherein said first plurality of locators are arranged in spaced relation along a length of said first beam, and said second plurality of locators are arranged at corresponding locations along a length of said second beam.

68. A modular shelving system according to claim 67, wherein said first plurality of locators are spaced at regular intervals.

69. A modular shelving system according to claim 68, wherein said first plurality of locators includes at least one indexed locator.

70. A modular shelving system according to claim 69, comprising plural indexed locators.

71. A modular shelving system according to claim 70, wherein said plural indexed locators are spaced at regular intervals along the length of said first beam.

72. A modular shelving system according to claim 69, wherein said second plurality of locators includes at least one corresponding indexed locator.

73. A modular shelving system according to claim 71, wherein said second plurality of locators includes corresponding plural indexed locators.

74. A modular shelving system according to claim 60, wherein each of said first beam and said second beam has a top surface and a bottom surface and said mat is suspended at a location below said top surface, thereby forming a trough with said first beam and said second beam.

75. A divider assembly for a shelf, comprising:
at least two dividers supportable on a lower shelf and at least one divider supportable on an upper shelf,
where each divider includes first and second support beams and a plurality of partitions disposed between said first and second support beams, each of said first and second support beams being supportable on the shelf at first and second ends of the support beams, each of said plurality of partitions being supported at respective ends thereof by said first and second support beams and projecting away from said first and second support beams, thereby defining a respective plurality of slots between said plurality of partitions,
where at least one divider supportable on the lower shelf and said at least one divider supportable on the upper shelf are substantially parallel,
wherein each of said plurality of partitions projects into an interior region between the lower shelf and the upper shelf,
and wherein respective partitions of said dividers are arranged in-line with each other.

76. A divider assembly according to claim 75, wherein said partitions and respective plurality of slots are parallel.

77. A divider assembly for a shelf, comprising:
at least one divider including first and second support beams and a plurality of partitions disposed between said first and second support beams, each of said first and second support beams having an open wire structure and being supportable on the shelf at first and second ends of the support beams, each of said plurality of partitions being supported at respective ends thereof by said first and second support beams and projecting away from said first and second support beams, thereby defining a respective plurality of slots between said plurality of partitions.

78. A divider assembly according to claim 77, wherein each support beam comprises an upper wire, a lower wire and a central wire that is bent in a serpentine manner between said upper wire and said lower wire, said central wire being fixed to said upper wire and lower wire at bent portions of the central wire.

79. A divider assembly according to claim 78, wherein said upper wire and said lower wire are substantially parallel to each other.

80. A divider assembly according to claim 78, wherein each partition comprises a generally U-shaped wire hoop fixed at one end to at least one of the upper wire, the central wire and the lower wire of one of said first and second support beams and fixed at the other one of said pair of ends to at least one of the upper wire, the central wire and the lower wire of the other support beam.

81. A divider for a shelf, comprising:
a first beam supportable on the shelf at first and second ends of the first beam, and including a first plurality of locators;
a second beam supportable on the shelf at first and second ends of the second beam, and including a respective plurality of locators;
a mat supported by and suspended between said first beam and said second beam; and
a plurality of partitions, each partition including a first end, engageable with one of said first plurality of locators, and a second end engageable with one of said respective plurality of locators,
wherein said first beam and said second beam comprise respective first and second supports and said mat comprises corresponding first and second projections respectively engageable with said first and second supports.

82. A divider according to claim 81, wherein said first and second supports respectively are defined by a plurality of holes formed in the first beam and a plurality of holes formed in the second beam.

83. A divider according to claim 82, wherein said mat is an open wire mat.

84. A divider for a shelf, comprising:
a first beam supportable on the shelf at first and second ends of the first beam, and including a first plurality of locators;
a second beam supportable on the shelf at first and second ends of the second beam, and including a respective plurality of locators;
a plurality of partitions, each partition including a first end, engageable with one of said first plurality of locators, and a second end engageable with one of said respective plurality of locators;
and an open wire mat supported by and suspended between said first beam and said second beam.

85. A divider for a shelf, comprising:
a first beam supportable on the shelf at first and second ends of the first beam, and including a first plurality of locators;
a second beam supportable on the shelf at first and second ends of the second beam, and including a respective plurality of locators; and
a plurality of partitions, each partition including a first end, engageable with one of said first plurality of locators, and a second end engageable with one of said respective plurality of locators,
wherein each of said first beam and said second beam is made of a metal sheet, and wherein said first plurality of locators comprises a first plurality of slots formed in said first beam and said second plurality of locators comprises a second plurality of slots formed in said second beam.

86. A divider according to claim 85, wherein each of said plurality of partitions comprises a wire hoop.

87. A divider for a shelf, comprising:
a first beam supportable on the shelf at first and second ends of the first beam, and including a first plurality of locators;
a second beam supportable on the shelf at first and second ends of the second beam, and including a respective plurality of locators; and
a plurality of partitions, each partition including a first end, engageable with one of said first plurality of locators, and a second end engageable with one of said respective plurality of locators,
wherein said first plurality of locators are arranged in spaced relation along a length of said first beam, and said second plurality of locators are arranged at corresponding locations along a length of said second beam,
wherein said first plurality of locators are spaced at regular intervals, and
wherein said first plurality of locators includes at least one indexed locator.

88. A divider according to claim 87, comprising plural indexed locators.

89. A divider according to claim 88, wherein said plural indexed locators are spaced at regular intervals along the length of said first beam.

90. A divider according to claim 89, wherein said second plurality of locators includes at least one corresponding indexed locator.

91. A divider according to claim 89, wherein said second plurality of locators includes corresponding plural indexed locators.

92. A divider assembly for use with a shelving system, said assembly comprising:

a first divider having a plurality of partitions and being supportable on a first shelf by opposite ends thereof; and a second divider having a plurality of partitions and being supportable on a second shelf by opposite ends thereof, wherein said plurality of partitions of said first divider and said plurality of partitions of said second divider extend into an interspace defined between the first and second shelves.

93. A divider for a shelf, comprising:

a beam supportable on the shelf by opposite ends thereof, said beam including a first array of locators, a second array of locators, and a trough located between said first array of locators and said second arrays of locators; and a plurality of partitions, each partition including a first end insertable in one of the first array of locators and a second end insertable in one of the second array of locators.

* * * * *

UNITED STATES PATENT AND TRADEMARK OFFICE
CERTIFICATE OF CORRECTION

PATENT NO.    : 6,116,436
DATED         : September 12, 2000
INVENTOR(S)   : ROBERT D. FERRUCCI, ET AL.

It is certified that error appears in the above-identified patent and that said Letters Patent is hereby corrected as shown below:

COLUMN 7:

Line 29, "a" should read --of a--; and
Line 38, "illustrate" should read --illustrates--.

COLUMN 14:

Line 4, "partitions, and" should read --partitions; and--.

Signed and Sealed this

Twenty-second Day of May, 2001

Attest:

NICHOLAS P. GODICI

Attesting Officer

Acting Director of the United States Patent and Trademark Office